United States Patent [19]

Stenning

[11] 3,749,892
[45] July 31, 1973

[54] ACCOUNTANCY SYSTEM

[75] Inventor: Patrick John Stenning, Belfast, Northern Ireland

[73] Assignee: Qeleg Limited, Dublin, Northern Ireland

[22] Filed: Feb. 16, 1972

[21] Appl. No.: 226,918

[30] Foreign Application Priority Data
Feb. 16, 1971 Great Britain..................... 4,770/71

[52] U.S. Cl................ 235/150.5, 235/184, 235/193
[51] Int. Cl. .............................................. G06j 1/00
[58] Field of Search................. 235/193, 184, 150.5, 235/92 AC, 194, 195, 196; 35/24 C

[56] References Cited
UNITED STATES PATENTS
3,018,050   1/1962   Barrell .............................. 235/193
3,270,190   8/1966   Lambert ........................... 235/184
3,491,194   1/1970   Smith................................ 235/184 X
2,916,212   12/1959  Mita................................... 235/184
3,500,030   3/1970   Clarke ............................... 235/184
3,634,669   1/1971   Soumas et al...................... 235/184

Primary Examiner—Joseph F. Ruggiero
Attorney—Thomas B. Van Poole et al.

[57] ABSTRACT

An analogue simulator is disclosed for dynamically simulating and visually presenting the projected financial situation of a commercial enterprise or the like over a time period of 24 time intervals. The time intervals are usually months and the computer has a simulator for the Balance Sheet which is updated at the end of each month, a simulator for the Profit and Loss Account which can be programmed to show the Profit and Loss for each one month interval and a projected sales, purchases and capital expenditure simulator in which details of the projected history of the company can be entered and stored. The system is controlled to enable manual selection of the time interval over which computations are to be effected and an automatic scan enables sequential computations to be made at the end of each month within the selected time period.

7 Claims, 11 Drawing Figures

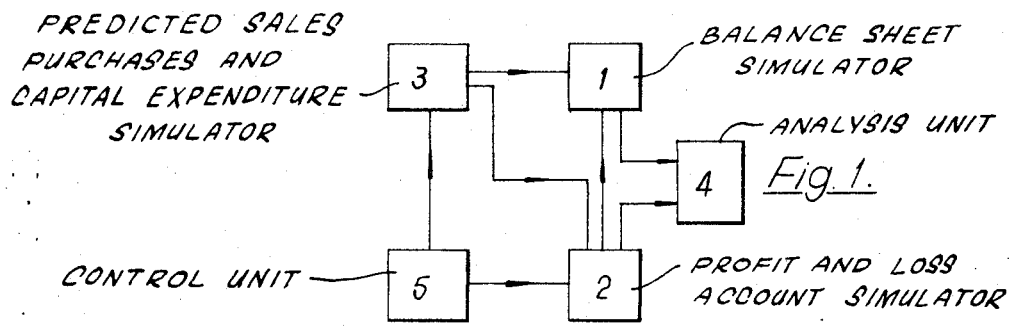
Fig. 1.
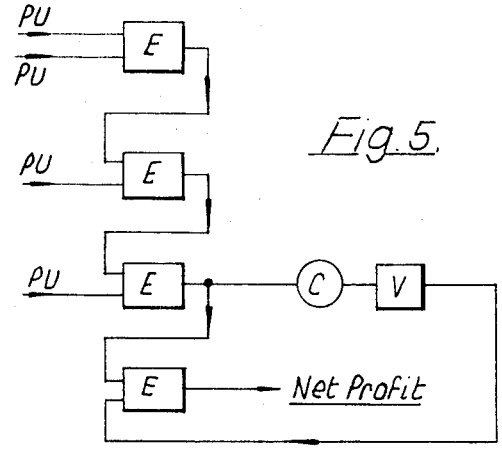
Fig. 4
Fig. 5.

Fixed Assets

Plant and Machinery (P) [DRO]  Less Depreciation (P) [DRO]
Motor Vehicles (P) [DRO]  do. (P) [DRO]
Fixtures and Fittings (P) [DRO]  do. (P) [DRO]  Total Fixed Assets [DRO]

Current Assets

Stock (P) [DRO]
Debtors (P) [DRO]
Cash (P) [DRO]
Other Current Assets (P) [DRO]  Total Current Assets [DRO]

Current Liabilities  Total Assets [DRO]

Creditors (P) [DRO]
Overdraft (P) [DRO]
Dividends Due (P) [DRO]
Current Taxation (P) [DRO]  Total Current Liabilities [DRO]

Loan Capital

Loan (type 1) (P) [DRO]
Loan (type 2) (P) [DRO]  Total Loan Capital [DRO]

Share Capital

Shares (type 1) (P) [DRO]
Shares (type 2) (P) [DRO]  Total Share Capital [DRO]

Reserves

General Reserves (P) [DRO]
Other Reserves (P) [DRO]  Total Reserves [DRO]

Total Liabilities [DRO]

*Fig. 2.*

ACCOUNTANCY SYSTEM

This invention relates to a system for dynamically simulating and visually presenting the projected financial situation of a commercial enterprise or the like hereinafter referred to simply as "company," in order to aid the process of financial decision making.

According to the present invention there is provided a system for dynamically simulating and visually presenting the projected financial situation of a company, comprising a first simulator representative of a balance sheet, a second simulator representative of a profit and loss account, and a third simulator representative of predicted income and expenditure, an analyser unit coupled to analyse the output of said first and second simulators and capable of presenting a visual output representative thereof and control means coupled to said simulators and said analyser unit for controlling the operation of the system.

In accordance with the present invention the system enables the effects of variations in the financial position of a company to be assessed. For example commencing with the true present position of a company, its future position can be established by varying its predicted future transactions and this is especially helpful where alternative courses of action, leading to different future transactions, are possible. In another example the required starting conditions may be established for a company to achieve a known future position by means of known transactions in the intervening time interval.

The assessment is made by conventional accountancy techniques with reference to the estimated balance sheet and estimated profit and loss acount for the company; both being simulated electronically in one embodiment of the present invention. Conveniently the system uses those business ratios which are conventionally used by accountants, such as "liquidity ratio" (being the ratio of current assets to current liabilities at any given instant) or profit for a particular period/capital employed.

An embodiment of the present invention will now be described by way of example with reference to the accompanying drawings, in which:

FIG. 1 shows the system in block diagrammatic form;

FIG. 2 is illustrative of the visual display of the Balance Sheet simulator;

FIG. 4 is illustrative of the visual display of the Profit and Loss simulator;

FIG. 5 shows signal paths within the Profit and Loss simulator;

FIG. 9 *a* and *b* are circuits utilized in the analysis unit; and

Figure 10:
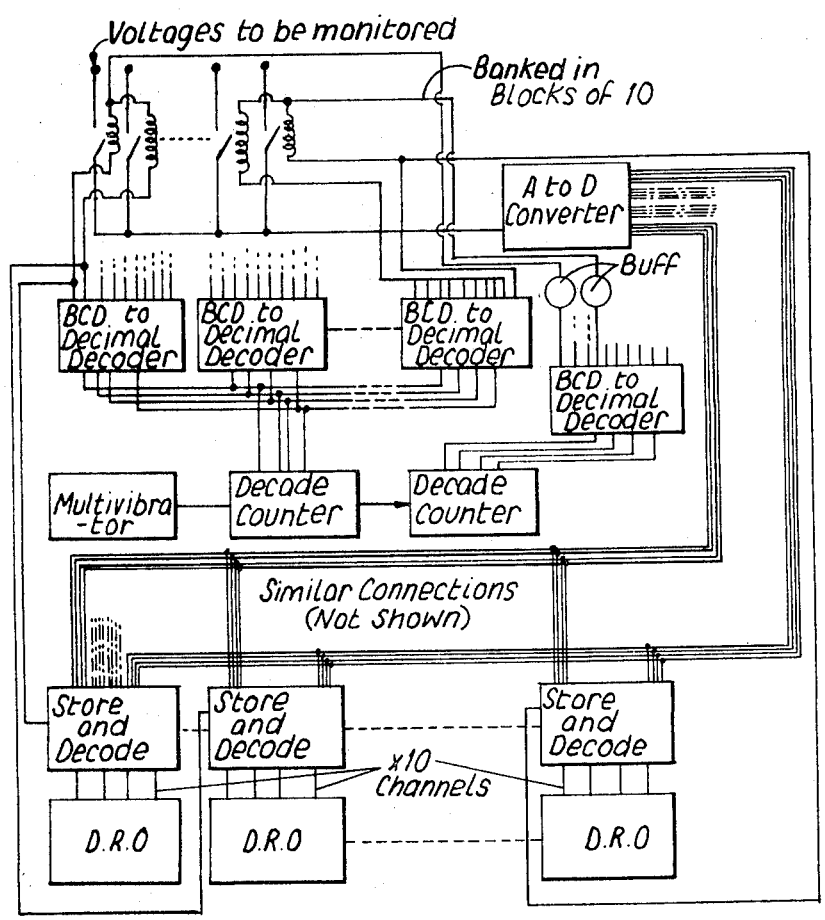

FIG. 10 is a circuit of a digital readout device for monitoring a plurality of points.

In the embodiment referred to in the drawings the system comprises three simulators, as shown in FIG. 1, namely a Balance Sheet (BS) simulator 1, a Profit- and-Loss Account (PLA) simulator 2, and a Predicted Sales, Purchases and Capital Expenditure (PSPCE) simulator 3, coupled with a control unit 5 and an analysis unit 4.

The visual display of the BS simulator 1 is shown in FIG. 2 and has provision for the storage and display of data defining Fixed Assets, Current Assets, Current Liabilities, Loan Capital, Share Capital and Reserves. Each of these is determined by the sum of various constituents parts, some of which are entered in a store by manual adjusment of a potentiometer positioned adjacent the read-out for the item concerned, but others are derived from the PSPCE simulator 3. Provision for depreciation of Fixed Assets is shown separately. In the BS simulator 1 the profit from any transaction is shown as an increase in reserves, and likewise a loss is shown as a decrease in reserves. This ensures that the two sides of the simulated Balance Sheet balance. In FIG. 2 the potentiometers are labelled P and the read-out device DRO. The read-out may be in either digital or analogue form or both.

Figure 3:
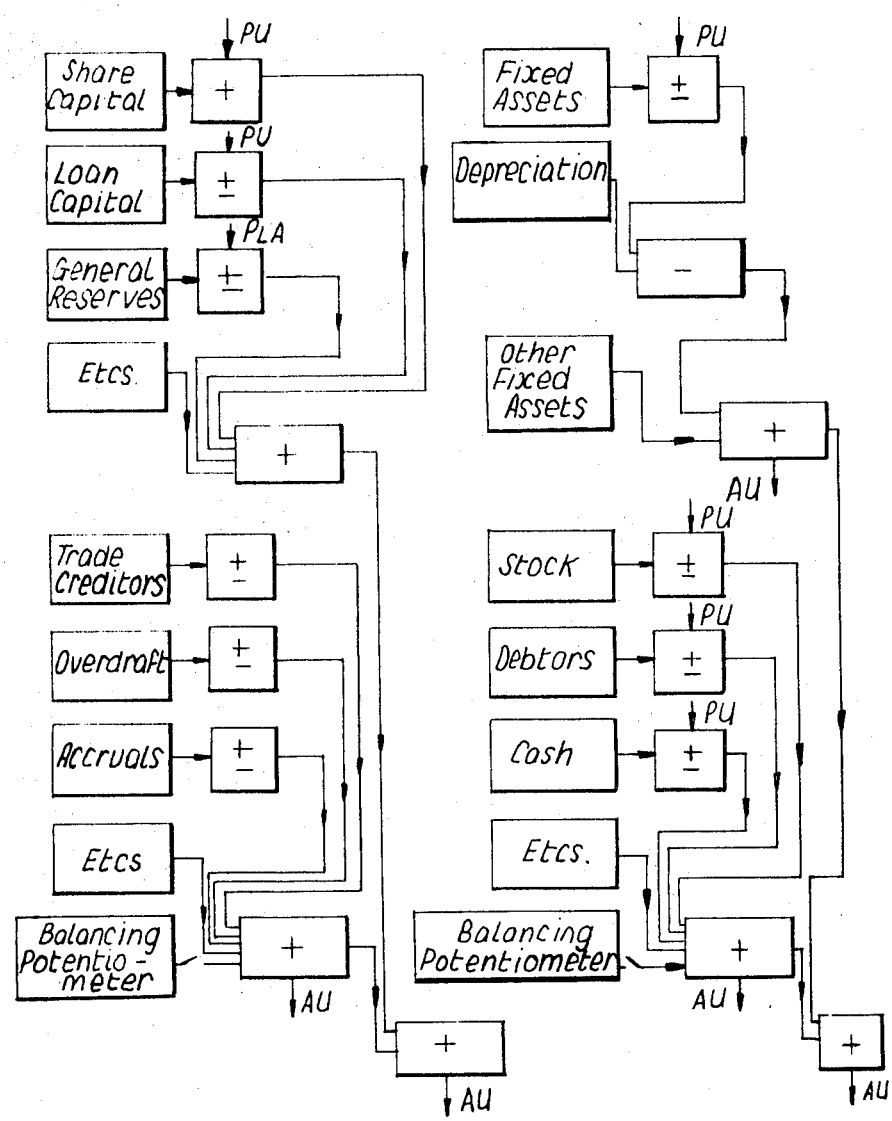
FIG. 3 shows signal paths within the Balance Sheet simulator.

FIG. 3 shows the signal paths within the BS simulator 1 of FIG. 2. In particular the various input signals obtained from the PSPCE simulator 3 of FIG. 1 are denoted by the letters PU and are summed algebraically with the pertaining data manually entered in the BS simulator 1. Various algebraically summed signals denoted AU, as illustrated, are output to the analysis unit 4 of FIG. 1. Balancing potentiometers are provided to enable adjustments to be made to the output of the analysis unit 4 without the necessity of altering any of the data in the BS simulator 1 which would interact with other signals. Normally the balancing potentiometers will be set to zero.

The visual display of the PLA simulator 2 is shown in FIG. 4 and has provision for sales income, cost of sales, operating expenses, non-operating expenses and tax liability in order to derive the gross profit, the operating profit, the pre-tax profit and the net profit. These profit figures are determined by successive subtraction of data entered in the PSPCE simulator 3 for each item of FIG. 4 by adjustment of a potentiometer in a manner similar to that employed for the BS simulator 1. The tax liability, however, is computed as a percentage of the pre-tax profit.

FIG. 5 shows the signal paths between amplifiers in the PLA simulator 2 of FIG. 4. Each of the elements marked E is a standard operational amplifier providing the difference of the two input signals. A potentiometer C and buffer amplifier V compute the tax liability from the signal representing pre-tax profits.

Figure 6:
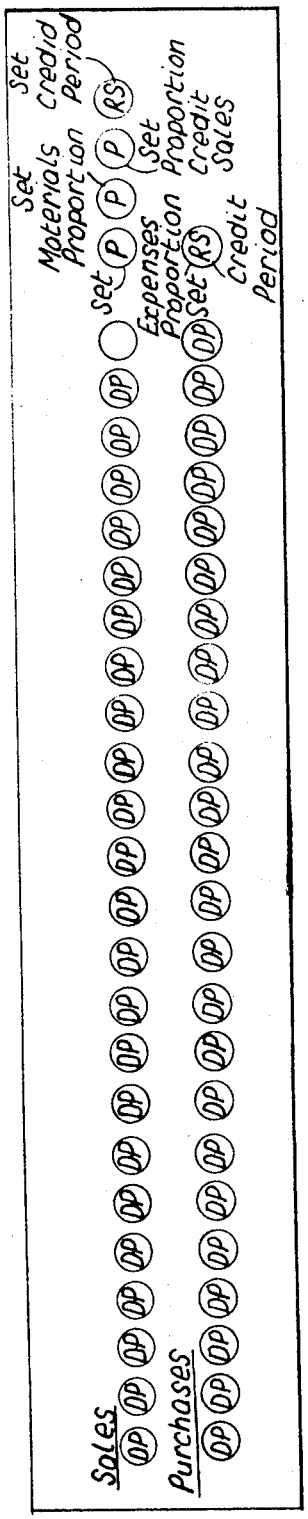
FIG. 6 shows part of the Predicted sales, purchases, and capital expenditure simulator.

The PSPCE simulator 3 of FIG. 1 has a plurality of similar sub-sections or product units, one being for each of the company's products. One such product unit (PU) is shown in FIG. 6 and comprises a plurality of potentiometers arranged in two banks respectively representative of the sales and purchases in respect of the product involved for each of 24 time intervals, usually 1 month. The outputs of these potentiometers are fed through relay-controlled switches to the relevant parts of the BS simulator 1 and the PLA simulator 2 of FIG. 1. The relays controlling which outputs are to be transmitted are controlled by the control unit 5 as will be explained in detail hereinafter.

The Pu of FIG. 6 also includes three 'set proportion' controls, these being preset potentiometers to provide further data for inclusion of the BS simulator 1 and PLA simulator 2 and providing a signal which is a known proportion of a signal derived from other computed signals.

Conveniently the potentiometers of the PU device of FIG. 6 are dual potentiometers to which a 10-volt supply is fed for the coarse adjustment and a 1-volt supply is provided for the fine adjustment of the signal which is provided by a summation of the two parts thereof.

Two rotary switches (RS) are provided respectively for the sales and purchases banks of potentiometers of the Product unit of FIG. 6 and permit the signals from the PU unit to be independently delayed with respect to the period or time interval under consideration as determined by the control unit 5 of FIG. 1. By way of example, shifts of up to three time intervals (i.e., usually 3 months) may be achieved in the application of the signals from the PU unit to the debtors or creditors totals in the BS simulator 1.

The PSPCE simulator 3 also includes Data units (not shown) for entering projected expenses and capital expenditure programs in the BS and PLA simulators. These data units function in a manner similar to the PU units shown in FIG. 6.

The control unit 5 of FIG. 1 has three main functions, namely enabling selection by an operator of a time interval to be considered at the end of which readings may be taken of the BS and PLA simulators, control of the system in accordance with that selection, and enabling an automatic scan of the BS and PLA simulators at various discrete times within the selected time interval.

Figure 7:
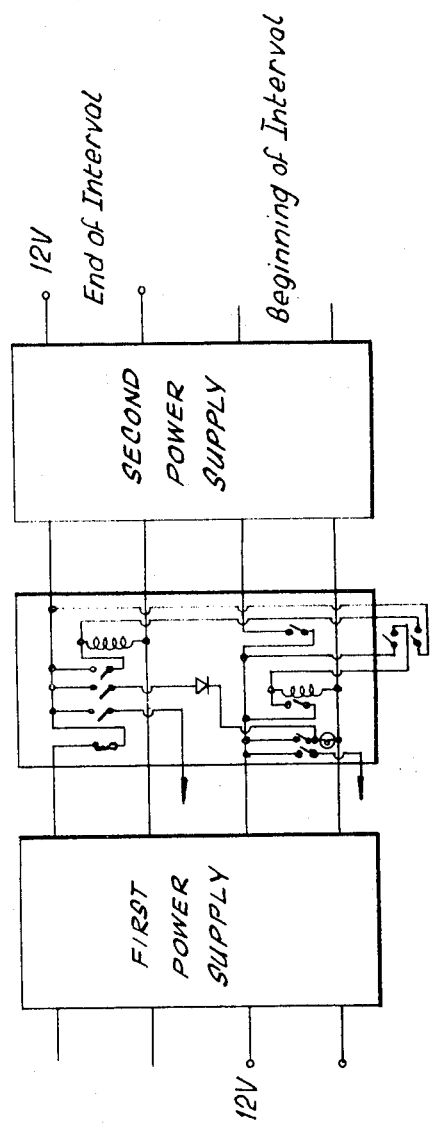
FIG. 7 shows the time interval selector circuit of the control unit.

The time interval selector circuit is shown in FIG. 7 and comprises a first power supply for a plurality of relays which determine the beginning of the time interval to be assessed, and a second power supply for a plurality of relays which determine the end of the time interval to be assessed. The two pluralities of relays are arranged in pairs each of which can be energized by one double pole rocker switch to determine a time interval of unit length and for this reason the circuitry of only one such pair is shown in detail. Each relay is self sustaining and has a contact to energize a neon lamp which illuminates the rocker switch to indicate that that switch is in an operative condition; in addition each relay opens a normally closed contact in the power supply to the adjacent relay whereby the actuated rocker switch which is farthest to the left in FIG. 7 determines the beginning of the time interval and the actuated switch which is farthest to the right in FIG. 7 determines the end of the time interval. Each end of interval relay has a contact which provides energizing power for the pertaining relays which control operation of the switches (not shown) in the lines from the PSCE simulator 3 to the BS and PLA simulators and furthermore control the operation of relay-controlled switches in the lines between the BS and PLA simulators and the Analysis Unit (AU) 4 of FIG. 1. A new beginning or end point may be set in the circuit of FIG. 7 by using the 'clear' facilities (not shown) which resets the circuits as appropriate.

Each of the beginning of interval relays has a contact which provides an inhibit signal to selected ones of the relays whereby only those relays which control the flow of information from the selected time interval and as entered in the PSPCE simulator will permit such information flow. All information between the beginning and end of the selected time interval is transferred to the BS and PLA simulators.

Figure 8:
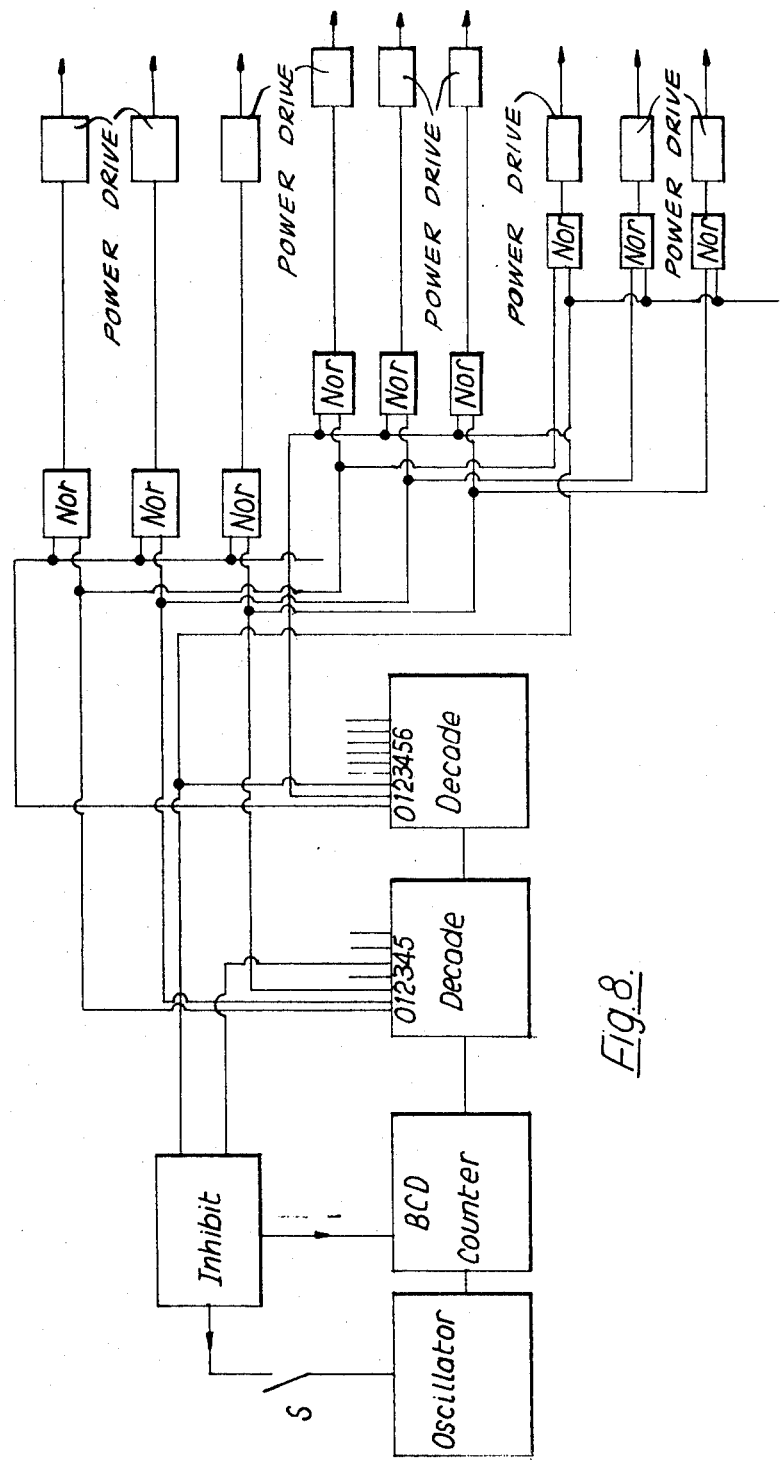
FIG. 8 is the automatic scan for the circuit of FIG. 7.

FIG. 8 shows the automatic scan circuit of the control unit 5 in block diagram form. The circuit includes an oscillator which feeds a BCD counter and a decoder comprising two decades connected in cascade. The automatic scan mode is initiated by manual closing of a switch S and when the counter reaches 24 an inhibit signal is initiated which stops the oscillator. During the time that the counter is counting to 24 successive ones of 24 power drives are energized and these drives energize the 24 relays which control the 24 time intervals having data set up in the PSPCE simulator 3. The counter also receives a reset signal after having counted to 24. The automatic scan circuit operates such that when a time interval of say four units has been set by the control unit 5 the performance of the company can be monitored at the end of each of the individual units of time within the selected time interval. Thus the progress of a company can be monitored.

Figure 9A:
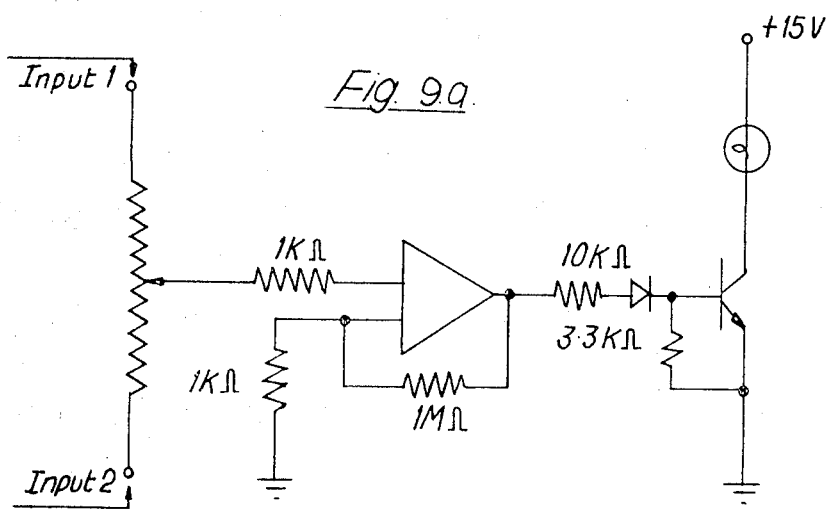
Figure 9B:
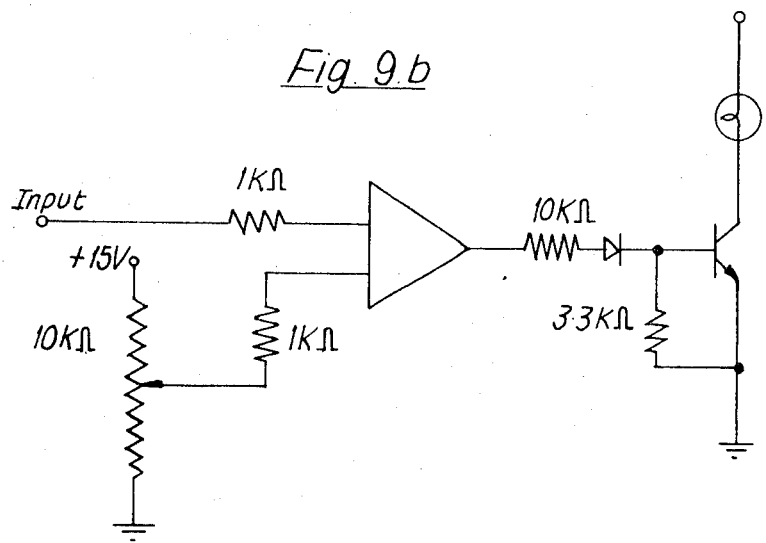

The analysis unit 4 of FIG. 1 receives inputs from both the BS and PLA simulators and derives various meaningful ratios from these figures as previously mentioned. The unit 4 indicates the numerical values for these ratios and whether or not preset limits for these ratios have been violated. One possible circuit for determining ratios is shown in FIG. 9a and a limit monitoring circuit is shown in FIG. 9b. Both of these circuits use high gain amplifiers to drive a transistor switch from a very small change of polarity, this change occurring when the preset ratio or limit is exceeded. For a maximum ratio limit an NPN transistor may be used, and a PNP transistor for a minimum limit. The analysis unit 4 may also monitor such items as "overdraft" and if preset limits of overdraft are violated this may be indicated by illumination of a lamp.

In order to provide a digital readout of the voltage at each of the points at which it is required to be known a single analogue-to-digital converter operating with a strobe and local latched or storage elements is used. This circuit is shown in FIG. 10. Each point at which the voltage is required to be known is connected by a normally open relay-actuated contact to an analogue-to-digital converter whose outputs in BCD form are stored in local latch storage units which feed the digital indicator concerned. The various relays are sequentially energised sequentially to apply the voltages to the A/D converter in conventional manner by utilizing digital counters driven by a multivibrator operating in a manner similar to that of the automatic scan of the control unit 5. The only limitation on this system is the repetition frequency, i.e., the time between successive interrogations of the same point.

Conveniently the storage units are bistable latches — i.e., digital devices whose outputs follow their inputs only on application of a latch-release signal to a further input.

An additional facility (not shown) coupled to the circuit of FIG. 10 enables the digital read-out to continuously up-date only one digital indicator.

In operation, the operator enters the predicted data for the projected time interval under consideration projected using a central digital read-out. Then when the data is entered, both in the PSPCE and BS simulators, together with the necessary setting of proportional setting devices (such as the tax liability potentiometer of the PLA simulator) the sub-time intervals to be considered in detail are selected by using the control unit 5. Thereafter the analysis of the financial position of the company is given by the analysis unit. If preset limits for business ratios are violated these are visually indicated by illumination of a lamp. Modifications to the project performance of the company may be made simply by altering the data entered in the PSPCE simulator and the effect on performance can be monitored.

Although only one product unit has been discussed in detail it is envisaged that the system will be capable of accommodating a plurality of such units. Likewise although information storage is by potentiometers other forms of input and storage could be utilized with suitable modifications.

I claim:

1. A system for dynamically simulating and visually presenting the projected financial situation of a company, comprising a first simulator representative of a balance sheet, a second simulator representative of a profit and loss account, and a third simulator representative of predicted income and expenditure having provision for simulation of each of a plurality of successive time intervals, an analyser unit coupled to analyse the output of said first and second simulators and capable of presenting a visual output representative thereof and control means coupled to said simulators and said analyser unit for controlling the operaiton of the system, said control means including a time interval selector for causing said analyser unit to analyse the output of the first and second simulators at the beginning and end of a selected time interval.

2. A system according to claim 1, wherein said control means includes an automatic scan means whereby sequential analyses may be displayed at the beginning and end of each time interval of said third simulator.

3. A system according to claim 1, wherein said third simulator includes delay means whereby transfer of information simulated in each of said time intervals may be delayed to simulate credit periods.

4. A system according to claim 1, including means for sequentially updating a plurality of digital read-out devices associated with flow paths in the system to be monitored.

5. A system according to claim 4, wherein the said last mentioned means comprises a binary counter which controls the switching of an analogue to digital converter.

6. A system according to claim 5, wherein the output of the converter is fed to a bistable latched circuit whose output feeds a digital indicator.

7. A system according to claim 4, wherein said last mentioned means is modified continuously to update a selected readout device.

* * * * *

UNITED STATES PATENT OFFICE
CERTIFICATE OF CORRECTION

Patent No. 3,749,892             Dated   July 31, 1973

Inventor(s)  PATRICK JOHN STENNING

It is certified that error appears in the above-identified patent and that said Letters Patent are hereby corrected as shown below:

In Column 1 of the first sheet of the patent, on the line following data element "[73]", the Assignee's name printed as "Qeleg" should read --Qeleq-- and the word "Northern" on that line and on the second line following data element "[75]" should be deleted.

Signed and sealed this 5th day of February 1974.

(SEAL)
Attest:

EDWARD M. FLETCHER, JR.          RENE D. TEGTMEYER
Attesting Officer                Acting Commissioner of Patents